M. H. GRAGG.
Corn Husker.
No. 24,843.
Patented July 19, 1859.
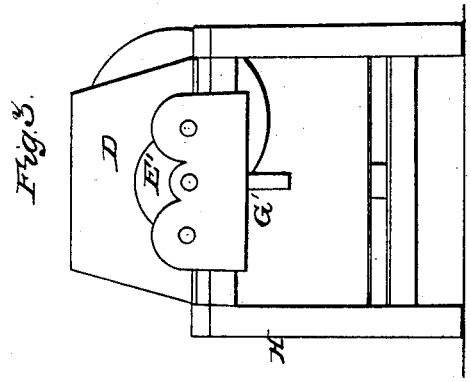
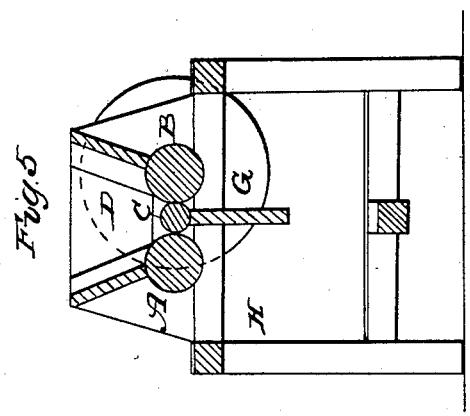
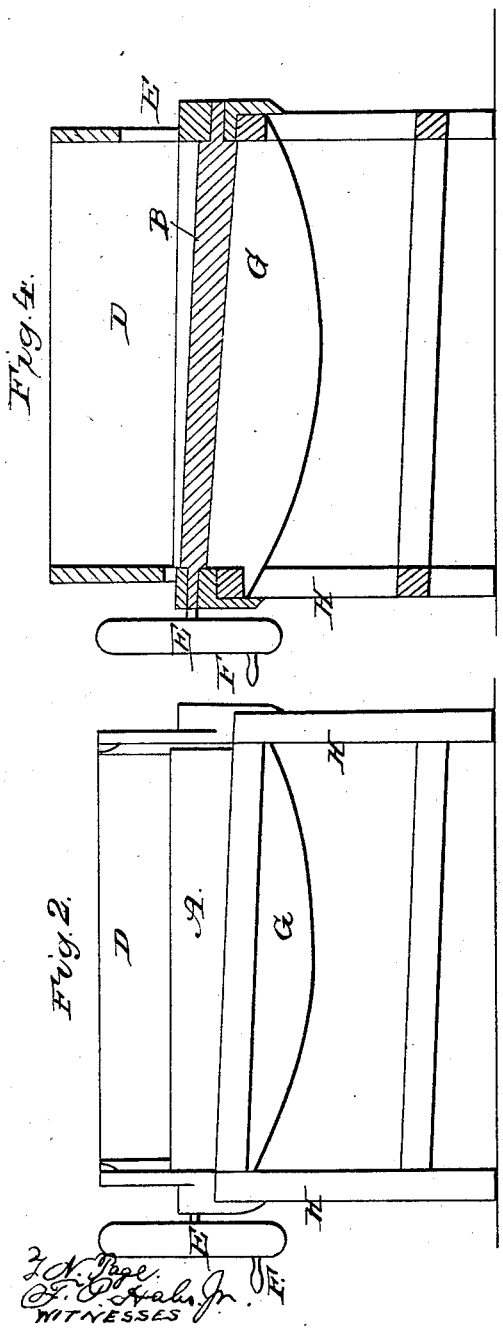
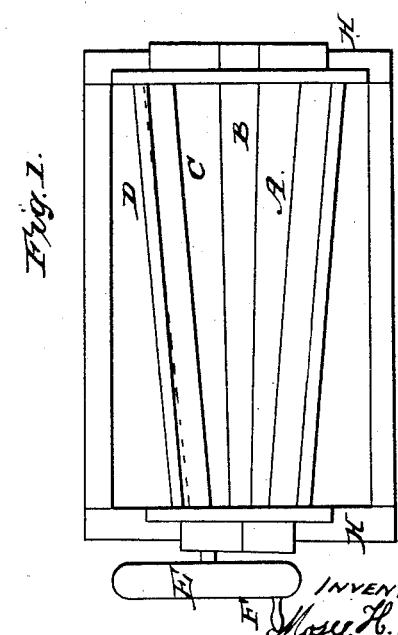

UNITED STATES PATENT OFFICE.

MOSES H. GRAGG, OF SOUTH BOSTON, MASSACHUSETTS, ASSIGNOR TO HIMSELF AND THO. N. PAGE, OF SOUTH BOSTON, MASSACHUSETTS.

CORN-HUSKER.

Specification of Letters Patent No. 24,843, dated July 19, 1859.

*To all whom it may concern:*

Be it known that I, MOSES H. GRAGG, of South Boston, in the county of Suffolk and State of Massachusetts, have invented a new and useful or Improved Machine for Husking Corn; and I do hereby declare that the same is fully described and represented in the following specification and the accompanying drawings, of which—

Figure 1, is a top view. Fig. 2, a front elevation. Fig. 3, a front end elevation. Fig. 4, a longitudinal section, and Fig. 5, a transverse section of it.

In carrying out my invention I make use of three conical rollers or frustra, arranged at the bottom of a hopper, out of one end of which there is a discharging opening. These conical rollers are shown in the drawings at A, B, C, as disposed under a hopper, D, and with their axes in or about in one plane—the arrangement of the rollers with respect to one another, the hopper and an opening, E′, at the larger end of the hopper being as represented in such drawings. While the two external rollers A, B, are alike in size the middle roller C is much less in diameter or size. They are placed together so that the external curved surfaces of the middle roller shall touch or nearly touch those of the others. The shaft of one of the rollers carries a fly wheel E and a crank F. If necessary, the three rollers may be geared together.

Underneath the small roller, and extending longitudinally of it as shown in Figs. 1, 3, and 5, is a partition or guard G supported by the frame H, by which the rollers and the hopper are sustained. The upper edge of the guard should come nearly or quite up to the surface of the roller, its office being to prevent the husks from being carried around the roller and up and between it and one of the external rollers.

When an ear of corn with the husks upon it is laid in the hopper, and the rollers are in motion, one of the external rollers operating with the middle roller will not only rotate the ear so as to present its husk to the bite of the middle roller and the other external roller but acting in conjunction with the middle roller will produce a longitudinal motion of the ear, such as will operate not only to facilitate its separation from the husks, but its discharge from the machine through the opening of the end of the hopper. Three cylindrical rollers will not produce such results, as they will not operate to discharge the ear in a longitudinal direction.

I do not claim the combination of three cylindrical rollers for the purpose of removing cotton or other fibrous material from seeds or other matters, nor do I claim as my invention any part or feature of the devices patented by E. F. French, May 12, 1857, N. T. Spear, Septr. 14, 1858, and Pickett & Hill, March 2, 1858; but

Having thus described my invention, I claim and desire to secure by Letters Patent,

The arrangement and combination of the small intermediate conical roller C, larger conical rollers A, B, guard G, and hopper D, as and for the purpose herein shown and described.

MOSES H. GRAGG.

Witnesses:
R. H. EDDY,
F. P. HALE, Jr.